United States Patent
Radic

(10) Patent No.: US 11,271,485 B2
(45) Date of Patent: Mar. 8, 2022

(54) SWITCHING MODE POWER SUPPLY WITH A VOLTAGE CLAMPING CIRCUIT

(71) Applicant: Appulse Power Inc., Toronto (CA)

(72) Inventor: Aleksandar Radic, Toronto (CA)

(73) Assignee: Appulse Power Inc., Toronto (CA)

( * ) Notice: Subject to any disclaimer, the term of this patent is extended or adjusted under 35 U.S.C. 154(b) by 0 days.

(21) Appl. No.: 17/135,462

(22) Filed: Dec. 28, 2020

(65) Prior Publication Data

US 2021/0119544 A1    Apr. 22, 2021

Related U.S. Application Data

(60) Continuation of application No. 16/399,006, filed on Apr. 30, 2019, now Pat. No. 10,897,207, which is a division of application No. 15/249,623, filed on Aug. 29, 2016, now Pat. No. 10,291,134.

(51) Int. Cl.
*H02M 3/335* (2006.01)
*H02M 1/08* (2006.01)
*H02M 1/00* (2006.01)

(52) U.S. Cl.
CPC ......... *H02M 3/33523* (2013.01); *H02M 1/08* (2013.01); *H02M 1/0009* (2021.05); *H02M 1/0025* (2021.05)

(58) Field of Classification Search
CPC ........... H02M 1/08; H02M 2001/0009; H02M 3/33523
See application file for complete search history.

(56) References Cited

U.S. PATENT DOCUMENTS

| | | | |
|---|---|---|---|
| 4,268,784 A | 5/1981 | Ganaway | |
| 5,298,845 A | 3/1994 | DeBoer et al. | |
| 5,493,488 A | 2/1996 | Castle et al. | |
| 5,689,407 A | 11/1997 | Marinus et al. | |
| 2011/0156680 A1 | 6/2011 | Yeh | |
| 2014/0218988 A1* | 8/2014 | Hayashi | H02M 7/06 363/126 |

(Continued)

FOREIGN PATENT DOCUMENTS

| CN | 202309043 U | 7/2012 |
|---|---|---|
| CN | 104617770 A | 5/2015 |
| CN | 104868737 A | 8/2015 |

OTHER PUBLICATIONS

Office Action dated Jan. 22, 2021 for Chinese Patent application No. 201780049825.4.

(Continued)

*Primary Examiner* — Kyle J Moody
*Assistant Examiner* — Lakaisha Jackson
(74) *Attorney, Agent, or Firm* — MLO, a professional corp.

(57) ABSTRACT

The anti-windup circuit generally has a voltage clamping device in series with a current limiting device operatively connectable to the output current path of a feedback compensator; the feedback compensator being part of a switch-mode power supply (SMPS) having an input voltage source and a load and generating constrained control values required to generate control on-off actions for tight power regulation. The inclusion of the disclosed anti-windup circuit in an SMPS may lead to hardware based overvoltage protection, reduced overall size and faster response to load changes.

17 Claims, 9 Drawing Sheets

(56) References Cited

U.S. PATENT DOCUMENTS

2015/0229249 A1* 8/2015 Jang ................... H02P 29/032
                                              318/139
2015/0244274 A1* 8/2015 Fahlenkamp ..... H02M 3/33523
                                              363/21.15

OTHER PUBLICATIONS

International Search Report and Written Opinion dated Nov. 28, 2017 for PCT Patent Application No. PCT/CA2017/051002.
Larsson, A Simple Antiwindup Method, International Journal of Control, 1994, Published Online Feb. 24, 2007.
Notice of Allowance dated Dec. 3, 2018 for U.S. Appl. No. 15/249,623.
Notice of Allowance dated Sep. 25, 2020 for U.S. Appl. No. 16/399,006.
Office Action dated Jul. 3, 2020 for Chinese Patent application No. 201780049825.4.
Office Action dated May 17, 2018 for U.S. Appl. No. 15/249,623.
Office Action dated May 27, 2020 for U.S. Appl. No. 16/399,006.
Office Action dated Sep. 8, 2017 for U.S. Appl. No. 15/249,623.
Rundqeist, Anti-Reset Windup for PID Controllers, Department of Automatic Control Lund Institute of Technology, Lund, Sweeden, Mar. 1991.

\* cited by examiner

900

Identify potential connection points for voltage clamping device (ie. In parallel with the output current path of the compensator) 902

Operate SMPS at controllability boundary (ie. minimum control signal) 904

Measure differential voltage at potential connection point for voltage clamping device 906

Select voltage clamping device with marginally larger clamping voltage than measured 908

Place voltage clamping device in parallel with connection points 910

Fig. 9

SWITCHING MODE POWER SUPPLY WITH A VOLTAGE CLAMPING CIRCUIT

CROSS-REFERENCE TO RELATED APPLICATION

This application is a continuation of co-pending U.S. patent application Ser. No. 16/399,066, filed Apr. 30, 2019, which is a divisional application of co-pending U.S. patent application Ser. No. 15/249,623, filed Aug. 29, 2016, all of which are hereby incorporated by reference in their entirety.

FIELD

Example embodiments generally relate to the field of switch-mode power supplies, and more particularly to the field of analog and mixed-signal control of isolated and non-isolated switch-mode power supplies and more particularly to the field of overvoltage protection.

BACKGROUND

Switch-mode power supplies (SMPSs) are important power management components in modern electronic devices. They provide, among other things, tightly regulated power to multiple sub-systems during all operating conditions. In order to achieve tight power regulation, conventionally one or more affordable and compact analog feedback control loops and multiple bulk reactive energy storage elements are required. The feedback control loops direct the energy flow between the SMPS input and output ports as quickly as possible, while the expensive and bulky energy storage elements consume/provide the difference between the input and output energy.

In order to ensure tight power regulation during steady-state, the feedback loop compensators utilize one or more integrators. However, during periods of control saturation, such as when the compensator generates negative control values, the compensator integrator components can suffer from wind-up phenomenon, causing control action delays and increased output voltage deviations. This results in an increase of the bulk reactive energy storage requirements, contributing to increased SMPS volume and cost. By constraining the duration and magnitude of wind-up, one can reduce the power loss, size and cost of switch-mode power supplies.

Additional difficulties with existing systems may be appreciated in view of the instant disclosure.

SUMMARY

In an example embodiment, there is provided an anti-windup circuit for use with a switching mode power supply involving a voltage clamping device and, in an example embodiment, a series current limiting device connected in parallel with the output current path of the feedback compensator.

The voltage clamping device may be in the form of a Zener diode, controlled Zener device (such as TL431, or others), transient voltage suppression (TVS) diode, voltage-dependent resistor (VDR), avalanche diode or similar device. By clamping the voltage of the output current path of the feedback compensator, a programmable restriction on the feedback current value, that is a minimum control value, may be imposed. In such a way, the embodiment minimizes the charging of the feedback compensator integrator during non-controllable states of operation, mitigating the wind-up phenomenon. The embodiment may also provide output voltage clamping (overvoltage protection) during periods of large voltage difference between the reference and instantaneous output voltage values, e.g. heavy-to-light load transients. In such a way, the feedback control delays may be minimized during transient states and the maximum positive difference between the output voltage and the reference voltage value may be minimized allowing for the reduction of the bulk reactive component storage requirements.

In an example embodiment, the series current limiting device may be provided in the form of a resistor, parasitic resistance, thermistor, or active current limiter. By limiting the current through the voltage clamping device, the maximum power dissipation of the voltage clamping device may be programmed. Furthermore, by limiting the current through the voltage clamping device the discharge rate of the SMPS output port reactive components during overvoltage conditions, which typically occur during heavy-to-light load transitions, may be adjusted.

In accordance with one aspect, there is provided a method for selecting the voltage clamping value, the method comprising: forcing the SMPS to operate near the controllability and non-controllability boundary, and measuring/calculating the feedback compensator output current path voltage.

According to an aspect, there is provided a switching mode power supply having a converter; a voltage input for the converter; a voltage output from the converter and configured to electrically couple to a load; a feedback compensator controlling the converter in response to detecting the voltage output; and an anti-windup circuit comprising a voltage clamping circuit connected in parallel with the feedback compensator. According to some aspects, the anti-windup circuit may minimize deviation of the output voltage during light-to-heavy transients.

The feedback compensator may generate a control signal for controlling the converter. In some aspects, the control signal may provide input to a pulse width modulator where the pulse width modulator providing switching input to the converter. The feedback compensator may generate the control signal using a comparison between the detected voltage output and a reference voltage to reduce deviation of the output voltage. The feedback compensator may comprise proportional-integral-derivative (PID) control. In some aspects, the feedback compensator may be an analog feedback compensator.

According to some aspects, the voltage clamping device may provide transient overvoltage protection. The voltage clamping circuit may be selected from at least one of a Zener diode, a shunt regulator, an active Zener device, a transient voltage suppression (TVS) diode, a voltage-dependent resistor (VDR), an avalanche diode, and/or any combination thereof.

In accordance with another aspect, the switching mode power supply may further comprise a comparator that may generate a negative control signal when the output voltage exceeds the reference voltage. The anti-windup circuit may reduce negative control signals from the comparator.

According to yet another aspect, the feedback compensator may generate the control signal according to at least one of discontinuous-current modulation (DCM), continuous-current modulation (CCM), pulse-frequency modulation (PFM), or quasi-resonant frequency (QR) operation.

According to other aspects, the anti-windup circuit may further comprise a current limiting circuit connected in series with the voltage clamping circuit. The current limiting circuit may be one or more of a field-effect transistor, a resistor, a thermistor, an active current limiter, and/or any combination thereof.

Some aspects may further have the feedback compensator isolating the voltage output from the control of the converter and the feedback compensator may be isolated using an opto-coupler.

According to another aspect, the switching mode power supply may be configured to accept either an alternating current or direct current as the voltage input. The converter may be a flyback converter.

According to another aspect, there is provided a method for selecting a clamping voltage for a voltage clamping circuit connected in parallel with a feedback compensator of a switching mode power supply. The method may operate the switching mode power supply, without the voltage clamping circuit, at a controllability and a non-controllability boundary; determine potential connection points for the voltage clamping circuit; calculate or measure a maximum differential analog voltage between the potential connection points; and select potential connection point for the voltage clamping circuit that has a minimally larger clamping voltage.

The method may additionally vary at least one transient operating condition of the switching mode power supply. The method may also optimize the voltage clamping circuit to reduce the feedback compensator wind-up and minimize an output voltage deviation during a heavy-to-light load transient operating condition and/or optimize the voltage clamping circuit to minimize the output voltage settling time during at least one transient operating condition.

According to yet another aspect there is provided a method of converting a voltage input into a voltage output. The method may receive the voltage input at a converter; convert the voltage input into the voltage output using the converter; connect the voltage output to a load; detect the voltage output across the load; control the converter in response to the detected voltage output using a compensator; and reduce the voltage output deviation using an anti-windup circuit comprising a voltage clamping circuit connected in parallel with the feedback compensator.

Many further features and combinations thereof may appear to those skilled in the art following a reading of the instant disclosure.

BRIEF DESCRIPTION OF THE FIGURES

One or more embodiments will now be described, by way of example only, with reference to the attached Figures, wherein:

FIG. 9 is a flowchart demonstrating a method for selecting a clamping voltage for a voltage clamping circuit of a switching mode power supply.

These drawings depict exemplary embodiments for illustrative purposes, and variations, alternative configurations, alternative components and modifications may be made to these exemplary figures.

DETAILED DESCRIPTION OF EXAMPLE EMBODIMENTS

Figure 1:
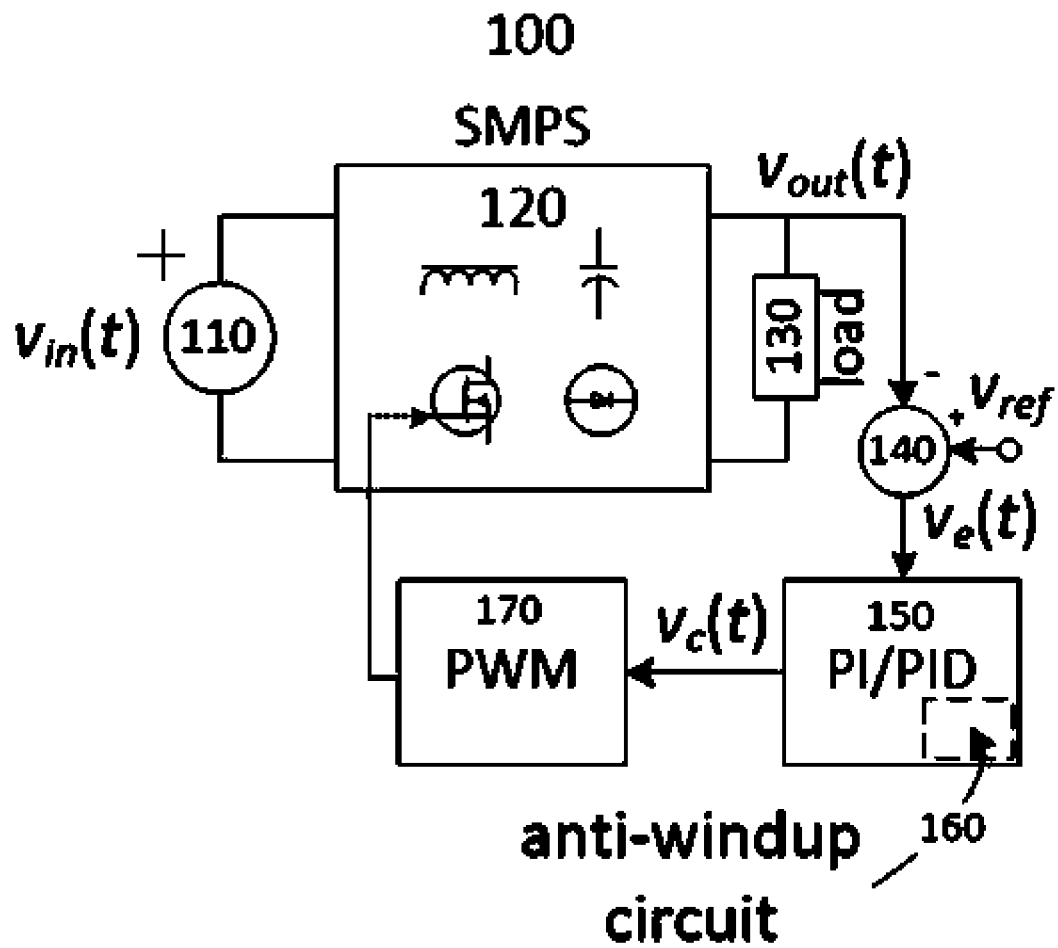
FIG. 1 is a schematic diagram of an example of a power supply, including an input voltage source, a SMPS, and an anti-windup feedback loop.

FIG. 1 shows an example of a power supply 100, in accordance with an embodiment. As depicted, the power supply 100 may have a voltage source 110 connected to the primary side port of a switching-mode power supply (SMPS) 120 with an input voltage $V_{in}$. The input voltage $V_{in}$ may be provided either as an alternating current (AC) or as a direct current (DC). The secondary side port of SMPS 120 is, in turn, connected to an output load 130 providing an output voltage $V_{out}$. The output voltage $V_{out}$ may be sensed and compared to a reference voltage $V_{ref}$ by a subtractor 140. The voltage difference $V_e$ is then processed by a compensator 150, which includes the embodied anti-windup circuit 160, in order to calculate a control signal $V_c$. The compensator 150 may comprise proportional, integral, or derivative control using a PI or PID controller. The control signal $V_c$ is passed to, in this example embodiment, a pulse-width modulator (PWM) 170 which generates an equivalent SMPS 120 switch on-off control actions. The control signal $V_c$ may be for discontinuous-current modulation (DCM), continuous-current modulation (CCM), pulse-frequency modulation (PFM), and/or quasi-resonant frequency (QR) operation.

Figure 2:
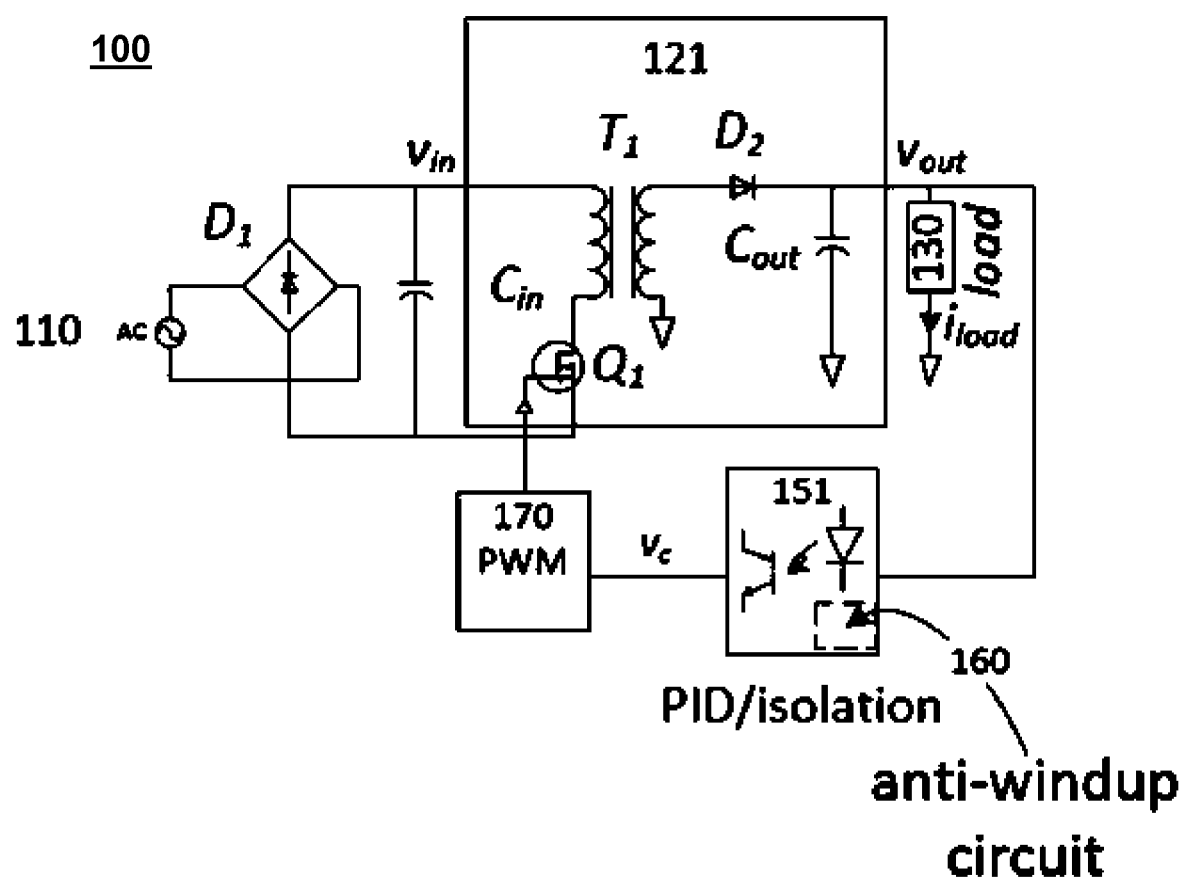
FIG. 2 is a schematic diagram of an example of a flyback converter for converting alternating current (AC) to direct current (DC)

FIG. 2 is another example of the power supply 100 for converting alternating current (AC) to direct current (DC). As shown, the flyback converter 121 has the voltage source 110 which is adapted, in this example, to provide AC voltage through an initial forward-biased diode $D_1$. The power supply 100 may have an input capacitor $C_{in}$ across the input to the flyback converter 121. The flyback converter 121 comprises a transformer $T_1$ in series with a transistor $Q_1$, which is switched using the output from the PWM circuit 170. The output of the transformer $T_1$ passes through a second forward-biased diode $D_2$. An output capacitor $C_{out}$ further smoothes the output voltage $V_{out}$. The load current $i_{load}$ produces the output voltage $V_{out}$. This specific embodiment has an isolated anti-windup circuit 160 equipped feedback compensator 151 that controls the PWM circuit 170.

Figure 3A:
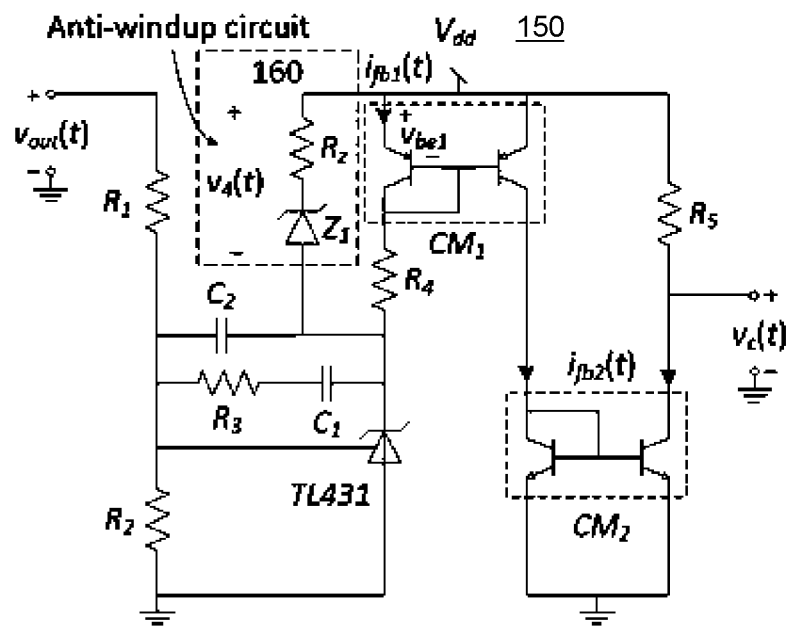
FIG. 3A is a schematic diagram of an example of the anti-windup non-isolated analog voltage mode type 2 compensator based on TL431-type shunt regulator of FIG. 1.

Turning now to FIG. 3A, an example of the anti-windup circuit 160 within the compensator 150. In this example, the compensator 150 may be a non-isolated type 2 compensator 150 based on a TL431 shunt regulator (e.g. Precision Programmable Reference) produced by Texas Instruments. The embodiment is composed of a Zener diode voltage clamping device $Z_1$ and a series resistive current limiting device $R_z$, placed in parallel with the output of the compensator output current path, $i_{fb1}(t)$. The output current $i_{fb1}(t)$ is mirrored through one or more current mirrors such as in this example, current mirror $CM_1$ and current mirror $CM_2$ to produce the control voltage $V_c(t)$ that controls the PWM circuit 170.

Figure 3B:
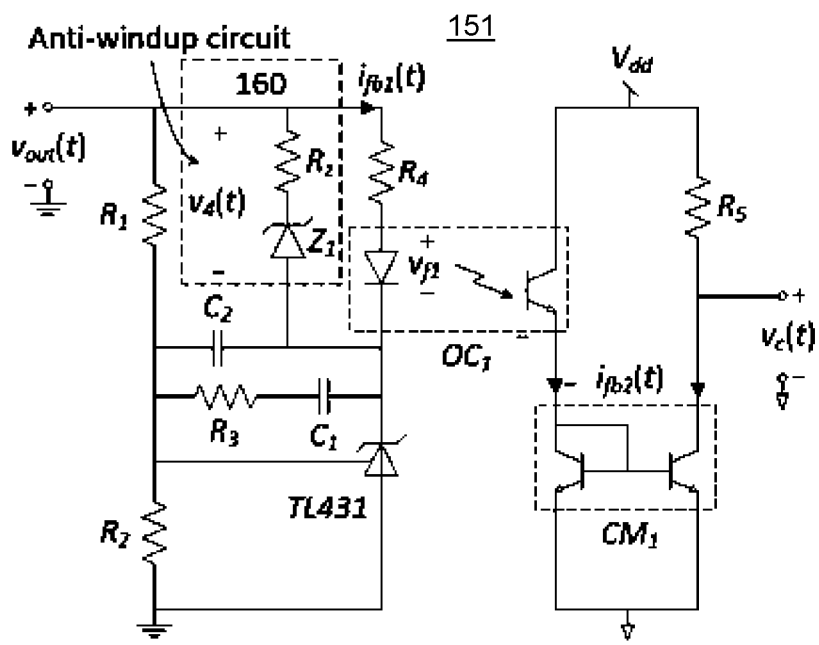
FIG. 3B is a schematic diagram of an example of the anti-windup isolated analog voltage mode type 2 compensator based on TL431-type shunt regulator and an opto-coupler of FIG. 2.

FIG. 3B is another example of the anti-windup circuit 160 within the compensator 151. In this example, the compensator 151 may be an isolated type 2 compensator 151 based on a TL431 shunt regulator and opto-coupler $OC_1$. The circuit is composed of a Zener diode voltage clamping device $Z_1$ and a series resistive current limiting device $R_z$, placed in parallel with the output of the compensator output current path, $i_{fb1}$. The output current path $i_{fb1}$ passes through the opto-coupler $OC_1$ and may be mirrored though a current mirror $CM_1$ to produce the control voltage $V_c(t)$ that controls the PWM circuit 170.

Figure 4:
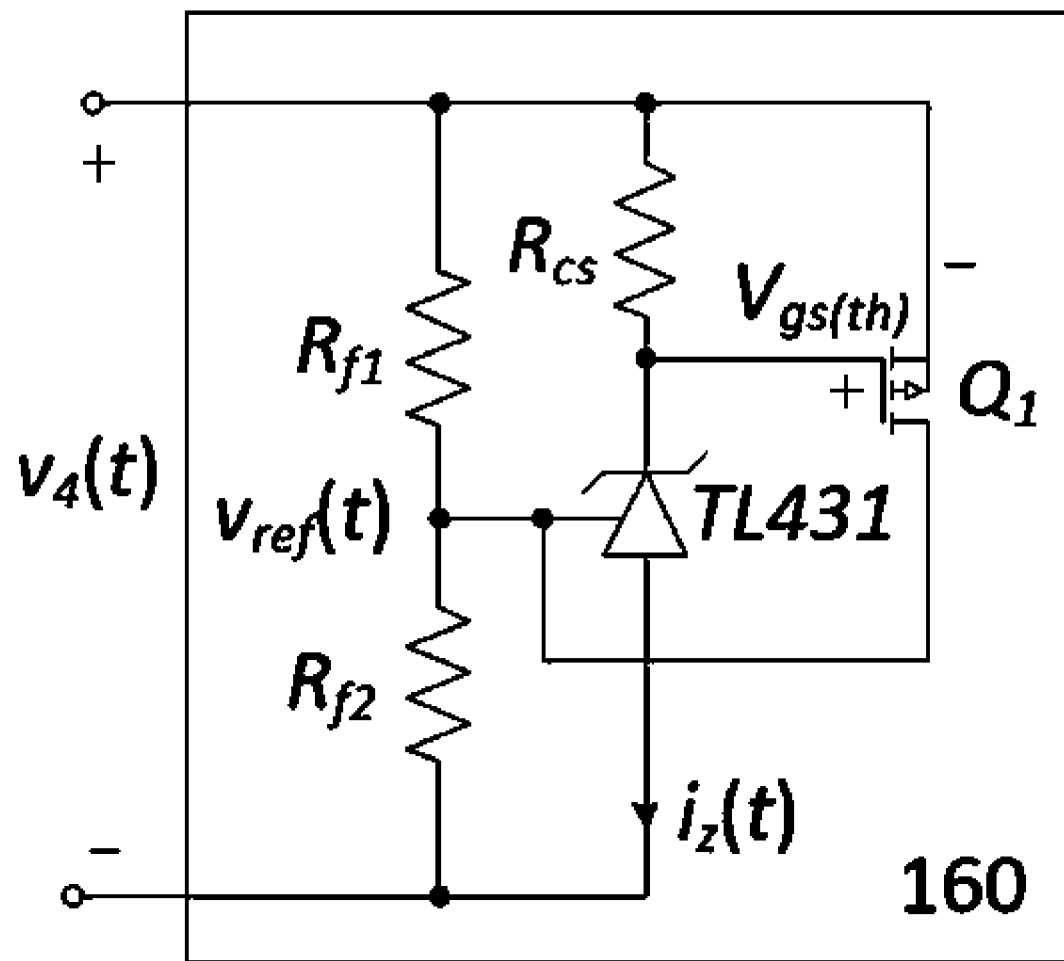
FIG. 4 is a schematic diagram of an example of the anti-windup circuit with current limiting.

FIG. 4 is another example of the anti-windup circuit 160 with a series current limiting device $Q_1$ which is adapted, in this example, to also clamp the current below a programmable maximum value. The anti-windup circuit 160 comprises a TL431 voltage clamping device and a feedback based P-Type Field-Effect Transistor (FET) $Q_1$ or resistive current limiting device. The TL431 voltage clamping device engages when the compensator output current path voltage $V_4(t)$ is greater than a programmable reference voltage $\sim(1+R_{f1}/R_{f2})*V_{ref}(t)$. During this period the $i_z(t)$ current is adjusted up to a maximum current value equal to $V_{gs}(t)/R_{cs}$.

Figure 5:
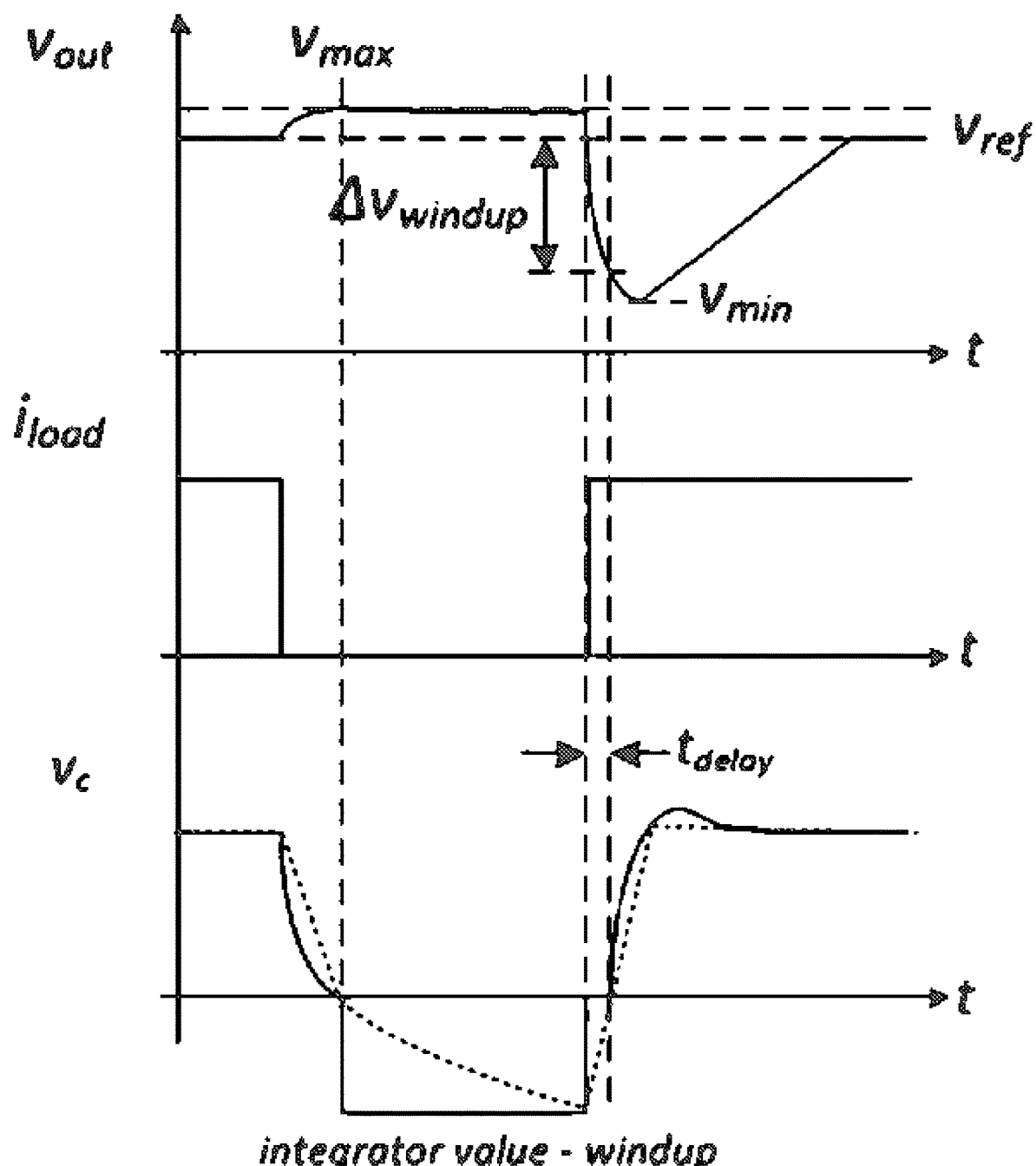
FIG. 5 is a graph of an exemplary curve showing the evolution of an output voltage, load current and control signal before, during and after an integrator wind-up condition of a flyback converter of FIG. 2.

The principle of operation of the embodiments shown in FIG. 3A, FIG. 3B and FIG. 4 may be explained by first analyzing the operation of the flyback converter 121 during integrator windup. FIG. 5 illustrates the output voltage $V_{out}$, output load current $i_{load}$ and feedback compensator output voltage $V_c$ and integrator voltage waveforms occurring during integrator windup conditions, caused in this example by a heavy-to-light load transient. A sufficiently large positive difference between the output voltage $V_{out}$ and the reference output voltage $V_{ref}$ eventually causes the feedback compensator 150 control voltage $V_c$ to reach zero. This zero point coincides with the controllability and non-controllability boundary point of the flyback converter 121, past which the feedback compensator integrator 150 experiences windup. Specifically, the circuit attempts to generate a negative control voltage $V_c$; however, due to the limitations of the flyback converter 121, a unidirectional power transfer SMPS 120, the PWM 170 is unable to generate an equivalent control action. As a result, without an anti-windup circuit the feedback compensator 150 (integrator) component increases until a negative voltage difference between the output voltage $V_{out}$ and reference output voltage $V_{ref}$ occurs. At this point, the feedback compensator 150 control voltage $V_c$ remains at zero until the integrator component voltage winds-down, causing a significant control action delay $t_{delay}$. The result of the time delay $t_{delay}$ is a large output voltage $V_{out}$ deviation $\Delta V_{windup}$, increasing the reactive component energy storage requirements.

The embodiments describe herein eliminate or significantly reduce the windup phenomenon by limiting the compensator 150/151 operation to a controllability region, specifically by limiting the compensator 150/151 from generating a negative control voltage $V_c(t)$ or equivalently an unbounded compensator output current $i_{fb1}(t)$ and/or $i_{fb2}(t)$. This may be achieved with a voltage clamping device, such as a TL431, placed in parallel with the output current path of the compensator 150/151.

Other examples may contain a protective current limiting device that limits (resistive element in FIG. 3A and FIG. 3B) or clamps (current sensor $R_{cs}$ and P-Type FET $Q_1$ in FIG. 4) the current through the voltage clamping device TL431.

Figure 6:
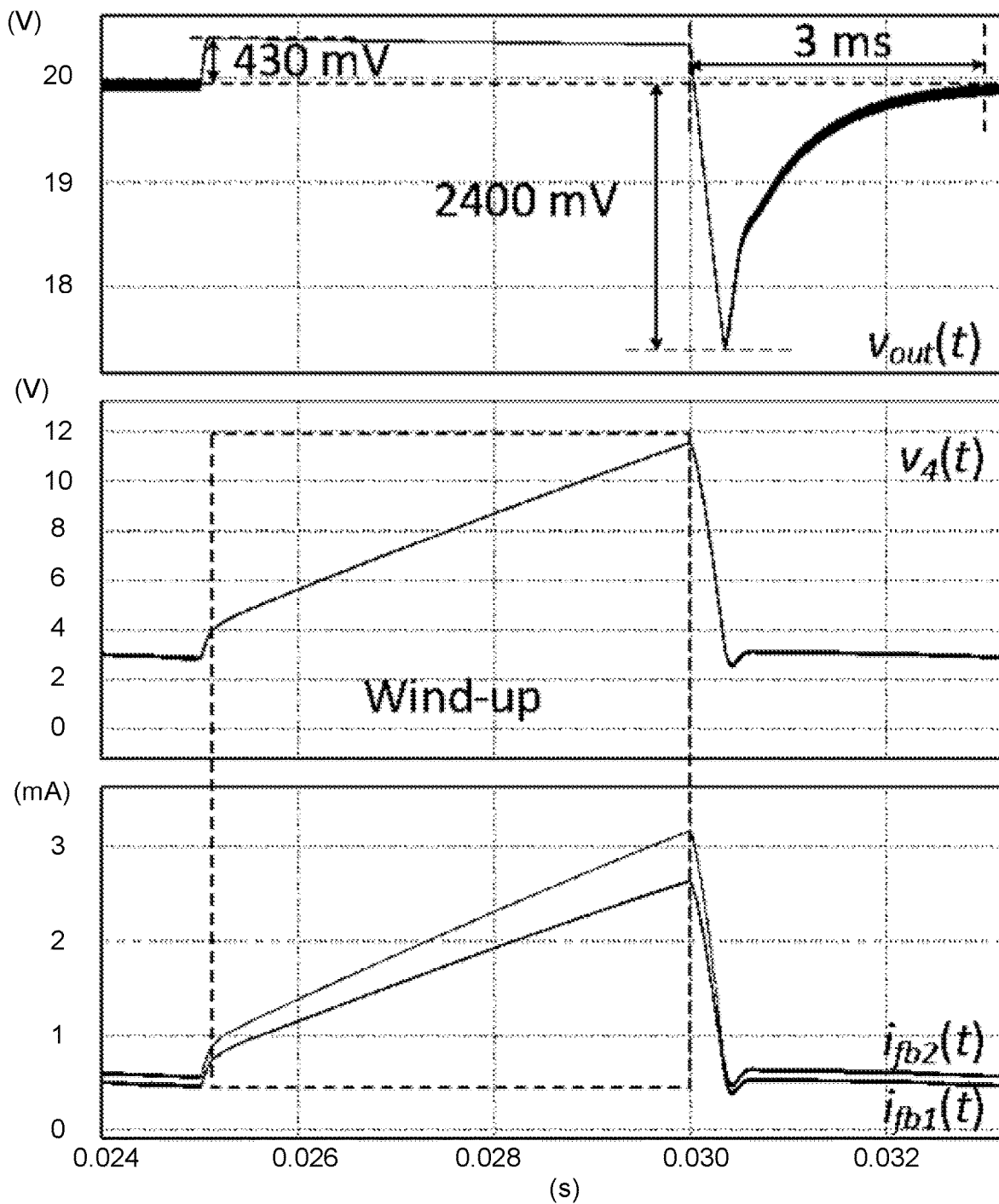
FIG. 6 is a graph showing the output voltage, feedback compensator output voltage and feedback compensator output currents as a function of time for a simulated flyback converter before, during and after a wind-up occurrence.
Figure 7:
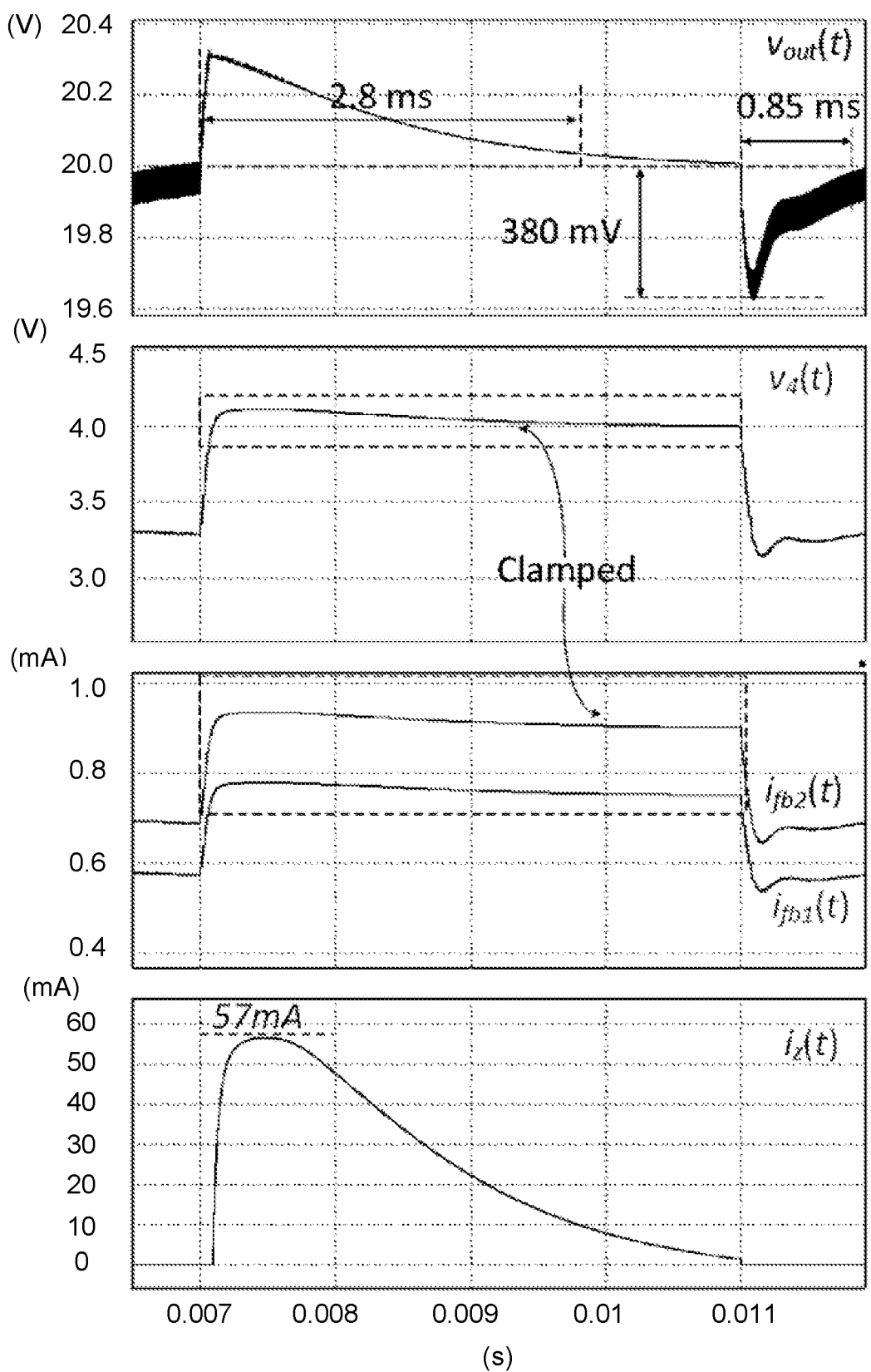
FIG. 7 is a graph showing the evolution of the output voltage, feedback compensator output voltage, feedback compensator output currents and anti-windup circuit current as a function of time for a simulated flyback converter with the anti-windup circuit during the same operating conditions as in FIG. 6.
Figure 8:
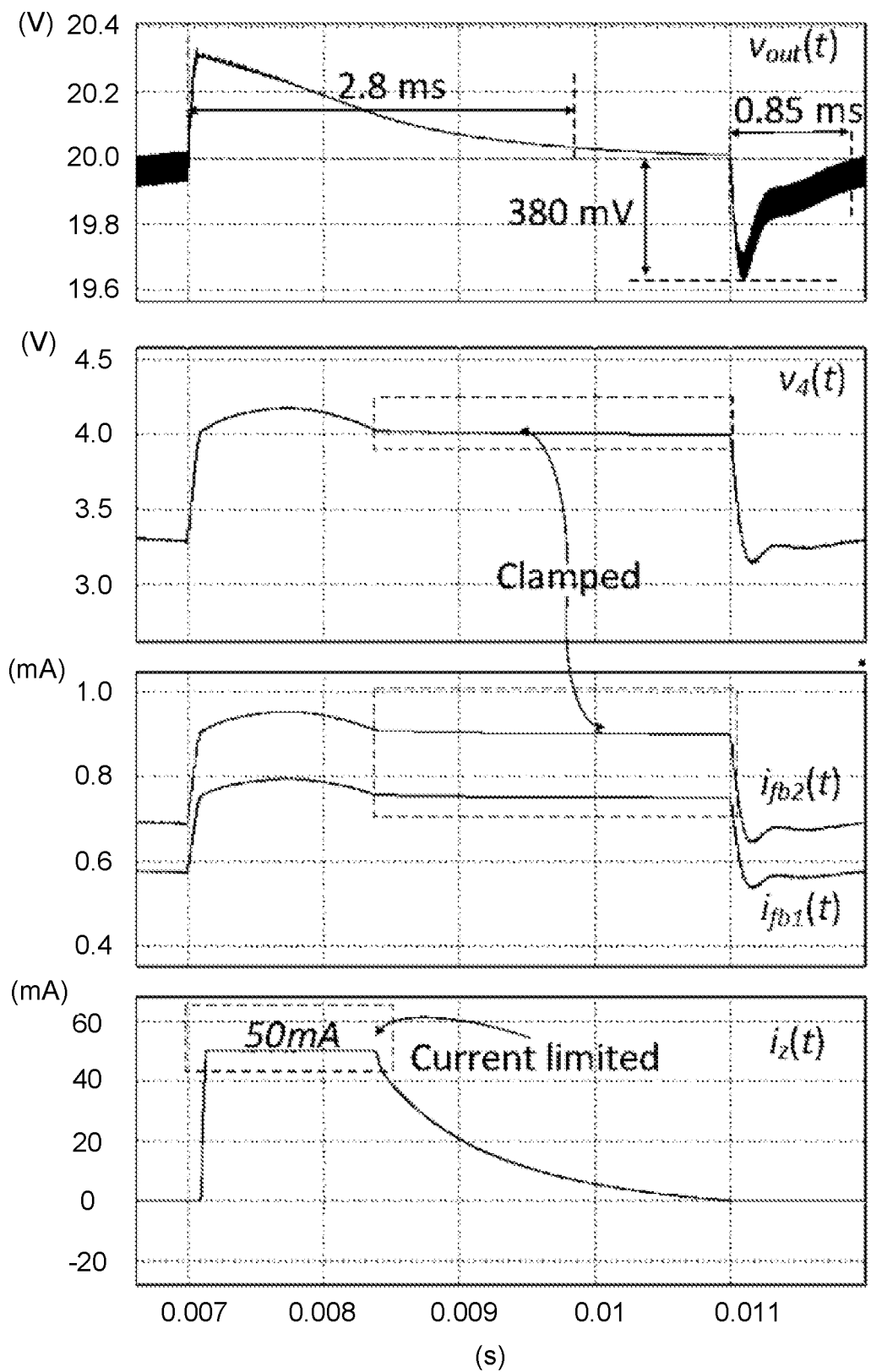
FIG. 8 is a graph showing the evolution of the output voltage, feedback compensator output voltage, feedback compensator output currents and anti-windup circuit current as a function of time for a simulated flyback converter with the current limited anti-windup circuit during the same operating conditions as in FIG. 6.

FIG. 6 shows the output voltage $V_{out}$, type 2 feedback compensator output current paths $i_{fb1}(t)$ and $i_{fb2}(t)$, and the compensator output current path voltage $V_4(t)$ graphs during a simulated flyback converter 121 integrator wind-up condition. FIG. 7 illustrates similar graphs for the anti-windup circuit 160 with the type 2 compensator 151 as shown in FIG. 3B. As can be seen, the type 2 compensator 151 enables six times reduction of the output voltage deviation (allowing for an equivalent reduction of the output reactive component size) and greater than 40% reduction of the settling time. Similar graphs are also illustrated in FIG. 8 for the when the anti-windup circuit 160 has current clamping, as shown in FIG. 4, being added to the type 2 compensator 151. The current clamping example enables a similar reduction of the output voltage $V_{out}$, settling time and maximum current.

Turning now to FIG. 9, a method for selecting a clamping voltage for a voltage clamping circuit is shown. The method 900 starts at step 902 by identifying potential connection points for the voltage clamping device (e.g. in parallel with the output current path of the feedback compensator). The SMPS may be operated near a controllability (or non-controllability) boundary (step 904), such as, for example, at a minimum control signal. The differential voltage may be measured (or in the case of a simulation, calculated) between the potential connection points for the voltage clamping device (step 906). The voltage clamping device may be selected with a marginally larger clamping voltage than measured (or calculated) at step 908. The voltage clamping device may be placed in parallel with the selected connection point (step 910).

An example embodiment is a method for selecting the voltage clamping value, the method including forcing the SMPS to operate near the controllability and non-controllability boundary, and measuring/calculating the feedback compensator output current path voltage.

In an example embodiment, the method is for selecting a clamping voltage for a voltage clamping circuit connected in parallel with the output current path of the feedback compensator of a switching mode power supply. The method includes: operating the switching mode power supply, without the voltage clamping circuit, at a controllability and a non-controllability boundary; identifying potential connection points for the voltage clamping circuit which are in parallel with the compensator output current path (e.g. as shown in FIGS. 3A and 3B); calculating or measuring a maximum differential analog voltage between the potential connection points; and selecting the voltage clamping circuit that has a minimally larger clamping voltage than the measured maximum differential analog voltage between the potential connection points.

Although particular current mirrors are demonstrated herein, other types of current mirrors may be substituted without affecting the operation of the circuits.

Although the voltage clamping device is shown with particular examples, other voltage clamping devices may be a Zener diode, a shunt regulator, an active Zener device (such as TL431 or others), a transient voltage suppression (TVS) diode, a voltage-dependent resistor (VDR), and/or an avalanche diode or similar device.

Although the current limiting device is described herein according to particular examples, other current limiting device such as a resistor (parasitic or added), a thermistor, and/or an active current limiter may be used.

Although the feedback compensator described herein implements proportional-integral-derivative (PID) control in an example embodiment, other feedback control systems may be used, which contain an integral type control action (e.g. proportional-integral (PI)) in other example embodiments.

As can be understood, the examples described above and illustrated are intended to be exemplary only. For instance, as may be readily understood by one skilled in the art, other embodiments of the anti-windup circuit 160 may be constructed with several different voltage clamping and current limiting devices, such as avalanche diodes and voltage-dependent resistors for the former and thermistors or BJT/FET based active current limiters for the latter.

In another example embodiment, an anti-windup kit may be provided for electrical attachment to the power supply. The kit may comprise a feedback compensator for attachment to the voltage output of the power supply, an anti-windup circuit comprising a voltage clamping circuit connected in parallel with the feedback compensator. In an example embodiment, the kit may include a plurality of different voltage clamping circuits each having a different clamping voltage, to which the most suitable voltage clamping circuit can be selected and assembled, for example using the method(s) described herein. In an example embodiment, the kit may further include any additional circuit element as previously described herein providing the additional functionality to the kit.

Variations may be made to some example embodiments, which may include combinations and sub-combinations of any of the above. The various embodiments presented above are merely examples and are in no way meant to limit the scope of this disclosure. Variations of the example embodiments described herein will be apparent to persons of ordinary skill in the art, such variations being within the intended scope of the present disclosure. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein intends to cover and embrace all suitable changes in technology.

Certain adaptations and modifications of the described embodiments can be made. Therefore, the above discussed embodiments are considered to be illustrative and not restrictive.

What is claimed is:

1. A switching mode power supply comprising:
a converter;
a voltage output, of the converter, that is configured to electrically couple to a load and to provide an output voltage;
a feedback compensator controlling the converter in response to detecting the output voltage; and
an anti-windup circuit, of the feedback compensator, comprising a current limiting device connected in a series combination with a voltage clamping device; and wherein:
the series combination of the current limiting device and the voltage clamping device is connected in parallel with an output current path of the feedback compensator; and
the voltage clamping device has a clamping voltage that is minimally larger than a calculated or measured maximum differential analog voltage between connection points for the voltage clamping device.

2. The switching mode power supply of claim 1, wherein the feedback compensator generates a control signal for controlling the converter.

3. The switching mode power supply of claim 2, wherein the feedback compensator generates the control signal using a comparison between the detected output voltage and a reference voltage to reduce a deviation of the output voltage.

4. The switching mode power supply of claim 3, wherein the control signal of the feedback compensator decreases towards a negative value control signal when the output voltage exceeds the reference voltage, wherein the anti-windup circuit prevents occurrences or minimizes an absolute value of negative value control signals from the feedback compensator.

5. The switching mode power supply of claim 4, wherein the feedback compensator comprises a proportional-integral-derivative controller.

6. The switching mode power supply of claim 2, wherein the control signal controls a pulse width modulator, the pulse width modulator providing switching input to the converter.

7. The switching mode power supply of claim 2, wherein the feedback compensator generates the control signal according to at least one of discontinuous-current modulation (DCM), continuous-current modulation (CCM), pulse-frequency modulation (PFM), or quasi-resonant frequency (QR) operation.

8. The switching mode power supply of claim 1, wherein the current limiting device comprises at least one of a field-effect transistor, a resistor, a thermistor, or an active current limiter.

9. The switching mode power supply of claim 1, wherein the feedback compensator comprises an analog feedback compensator.

10. The switching mode power supply of claim 9, wherein the feedback compensator isolates the output voltage from a control signal of the converter.

11. The switching mode power supply according to claim 10, wherein the feedback compensator is isolated using an opto-coupler.

12. The switching mode power supply of claim 1, wherein a voltage input of the converter is configured to receive either an alternating current or a direct current.

13. The switching mode power supply according to claim 1, wherein the converter comprises a flyback converter.

14. The switching mode power supply of claim 1, wherein the anti-windup circuit minimizes deviation of the output voltage during light-to-heavy transients.

15. The switching mode power supply of claim 1, wherein the voltage clamping device provides transient overvoltage protection.

16. The switching mode power supply of claim 1, wherein the voltage clamping device comprises at least one of a Zener diode, a shunt regulator, an active Zener device, a transient voltage suppression (TVS) diode, a voltage-dependent resistor (VDR), or an avalanche diode.

17. A method comprising:
receiving an input voltage at a converter;
converting the input voltage into an output voltage using the converter;
providing the output voltage to a load;
detecting the output voltage;
controlling the converter in response to the detected output voltage using a feedback compensator; and
reducing an output voltage deviation using an anti-windup circuit, of the feedback compensator, comprising a voltage clamping device connected in a series combination with a current limiting device, the series combination of the current limiting device and the voltage clamping device being connected in parallel with an output current path of the feedback compensator, and the voltage clamping device having a clamping voltage that is minimally larger than a calculated or measured maximum differential analog voltage between connection points for the voltage clamping device.

* * * * *